(12) United States Patent
Esna Ashari Esfahani (10) Patent No.: US 12,293,663 B2
(45) Date of Patent: May 6, 2025

(54) SYSTEM AND METHOD FOR PARKING SPOT SELECTION USING REINFORCEMENT LEARNING

(71) Applicant: GM Global Technology Operations LLC, Detroit, MI (US)

(72) Inventor: Alireza Esna Ashari Esfahani, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 298 days.

(21) Appl. No.: 18/057,274

(22) Filed: Nov. 21, 2022

(65) Prior Publication Data

US 2024/0169839 A1    May 23, 2024

(51) Int. Cl.
| | |
|---|---|
| G08G 1/14 | (2006.01) |
| G01C 21/34 | (2006.01) |
| G06N 3/092 | (2023.01) |
| G06V 20/58 | (2022.01) |
| H04W 4/40 | (2018.01) |

(52) U.S. Cl.
CPC ............. *G08G 1/141* (2013.01); *G06N 3/092* (2023.01); *G01C 21/3476* (2013.01); *G06V 20/584* (2022.01); *H04W 4/40* (2018.02)

(58) Field of Classification Search
CPC .... G08G 1/141; G06N 3/092; G01C 21/3476; G06V 20/584; H04W 4/40
See application file for complete search history.

(56) References Cited

U.S. PATENT DOCUMENTS

| | | | | |
|---|---|---|---|---|
| 2020/0011671 | A1* | 1/2020 | Puri | B60W 30/06 |
| 2022/0092979 | A1* | 3/2022 | Gambella | G01C 21/3685 |
| 2023/0102253 | A1* | 3/2023 | Lv | B60W 30/06 |
| | | | | 382/100 |
| 2023/0419200 | A1* | 12/2023 | Gupta | H04W 4/44 |

* cited by examiner

*Primary Examiner* — James J Lee
*Assistant Examiner* — Jonathan E Reinert
(74) *Attorney, Agent, or Firm* — Vivacqua Crane, PLLC (57) ABSTRACT

A system selecting a parking spot using reinforcement learning includes a first monitor evaluating available parking spots in a parking lot. Reinforcement learning (RL) is used to pick a parking spot based on user preferences. A computer computes a probability of a future parking spot availability from the available parking spots. An information source wherein the computer retrieves information including time of day, weather and location from the information source to assist in computing the probability of the future parking spot availability. An update module receives the future parking spot availability from the computer and updates a belief probability, the belief probability including a belief defined as a data structure in which a probability of the available individual parking spots within the parking lot is stored. An RL model is updated for the parking lot after a park maneuver is completed for a host vehicle.

18 Claims, 5 Drawing Sheets

SYSTEM AND METHOD FOR PARKING SPOT SELECTION USING REINFORCEMENT LEARNING

INTRODUCTION

The present disclosure relates to systems and methods to automatically identify and select a vehicle parking spot in a parking lot.

Current vehicle parking packages focus on finding an available parking spot and how to get to and park at the identified location. There is presently no method to optimize selecting a parking lot and actively selecting a parking spot within the parking lot based on user preferences.

Thus, while current vehicle parking packages achieve their intended purpose, there is a need for a new and improved system to identify a parking lot and a parking spot.

SUMMARY

According to several aspects, a system selecting a parking spot using reinforcement learning includes a first monitor evaluating available parking spots in a parking lot. A computer calculating a probability of a future parking spot availability from the available parking spots. An information source forwarding information to the computer including a time, weather and location from the information source to assist in calculating the probability of the future parking spot availability. An update module receives the future parking spot availability from the computer and updating a belief probability, the belief probability including a belief defined as a data structure in which the probability of the available individual parking spots within the parking lot is stored. A (reinforcement learning) RL model is located on a cloud and is updated for the parking lot after a park maneuver is completed for a host vehicle.

In another aspect of the present disclosure, a second monitor monitors users returning to one of multiple parked vehicles in the parking lot to assist calculating the probability of the future parking spot availability.

In another aspect of the present disclosure, a third monitor monitors an appearance of vehicle open trunks or hatches in the parking lot to assist calculating the probability of the future parking spot availability.

In another aspect of the present disclosure, a fourth monitor monitors illuminated backup and turn signals of one of the multiple parked vehicles to assist calculating the probability of the future parking spot availability.

In another aspect of the present disclosure, a fifth monitor monitors illuminated backup and turn signals of un-parked vehicles waiting to park to assist calculating the probability of the future parking spot availability.

In another aspect of the present disclosure, the belief is time-varying and depends on features of the parking lot including a quantity of parking spots, a parking lot geometry, parking spot locations, weather and perceptual information clues including slots being occupied, returning users, back-up lights on and turn signals on.

In another aspect of the present disclosure, a copy of the belief is located on the cloud and is updated based on data collected from multiple other vehicles equipped with the present system. A version is loaded, modified based on a perception system and exchanged information and updated on the cloud after vehicle parking.

In another aspect of the present disclosure, the belief is updated using at least one of a neural network and a predictor to keep the belief updated, and to predict the available parking spots for a period of time.

In another aspect of the present disclosure, a perception system monitors for evidence of users of multiple other vehicles who are returning to their vehicles to hunt for a next possible parking spot availability.

In another aspect of the present disclosure, a reinforcement learning setup has a Reward calculated using an equation wherein the Reward=$\alpha_i R_i$ where $\alpha_i$ are entered by a user via a vehicle screen, and where $R_i$ is obtained from at least one of: $R_1$=a total walking distance including returning a cart; $R_2$=a walking time to a destination such as a business door; $R_3$=a drive time to find a driving space; $R_4$=a parking shadow preference; $R_5$=identification if a handicap permit is required yes or no, $R_6$=identification if a heavy item pickup is required yes or no, $R_7$=identification if electrical vehicle charging is required, and $R_9$=identification if parking away from other vehicles is preferred.

According to several aspects, a method to select a parking spot using reinforcement learning, comprises: loading a map of a parking lot; loading an initial belief of a parking spot occupancy; identifying if one of a (vehicle-to-infrastructure) V2I communication, a (vehicle-to-vehicle) V2V communication and a V2X (vehicle-to-anything) communication is available and a parking lot command is available; updating an initial belief if a parking lot operator command exists; updating a belief matrix if the parking lot is equipped with V2I and get available parking spots, and if V2V is available; communicating and identifying occupied ones of the parking spots and updating the initial belief; getting information from a perception program including at least one of a host vehicle camera and a camera in a parking infrastructure, and updating the initial belief; running (reinforcement learning) RL to select a designated parking spot and if the operator command exists commanding a host vehicle to park in the designated parking spot; selecting the designated parking spot and commanding to move the host vehicle to the designated parking spot.

In another aspect of the present disclosure, the method further includes communicating with cameras and a perception system of other vehicles using V2V communication.

In another aspect of the present disclosure, the method further includes loading one of a default RL agent for an unvisited parking lot and a corresponding RL agent for the parking lot if the parking lot has already been visited by a previous user.

In another aspect of the present disclosure, the method further includes identifying if the designated parking spot is available when the host vehicle arrives at the designated parking spot.

In another aspect of the present disclosure, the method further includes updating the initial belief and sending all information to a cloud database to update an RL copy for a visited parking lot after the user completes a parking maneuver.

In another aspect of the present disclosure, the method further includes commanding to move the host vehicle into the designated parking spot when the host vehicle arrives at the designated parking spot.

In another aspect of the present disclosure, the method further includes: updating an RL model for the parking lot on a cloud database; and updating an RL model for the parking lot on the cloud database after the host vehicle completes the move into the designated parking spot; and updating the initial belief.

According to several aspects, a method to select a parking spot using reinforcement learning comprises: creating a new profile of multiple parking spots for multiple parking lots initializing with a pre-trained model; entering a host vehicle into a selected parking lot of the multiple parking lots and running a (reinforcement learning) RL program to select a designated parking spot of the selected parking lot; optimizing the selected parking spot based on a user input provided by a user; updating an initial belief of an occupancy of the designated parking spot; tracking a probability of a next available parking spot for a predetermined time period; and monitoring other users leaving a destination to identify potential parking spots becoming available applying information including available parking spots, open vehicle lids, illuminated backup lights and illuminated vehicle turn signals.

In another aspect of the present disclosure, the method further includes modifying the user input to include: a walking distance from the host vehicle parked in the designated parking spot to the destination; a moving time to move the host vehicle to the designated parking spot; a walking time for the user to walk from the host vehicle parked in the designated parking spot to the destination; a user preference to park in a shaded spot; an availability of an electrical vehicle charging station; and an availability of a pickup service.

In another aspect of the present disclosure, the method further includes: requesting movement of the host vehicle to the designated parking spot; communicating between the host vehicle and a camera of other vehicles in the selected parking lot to update the initial belief; and informing the other vehicles when the host vehicle leaves the designated parking spot.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
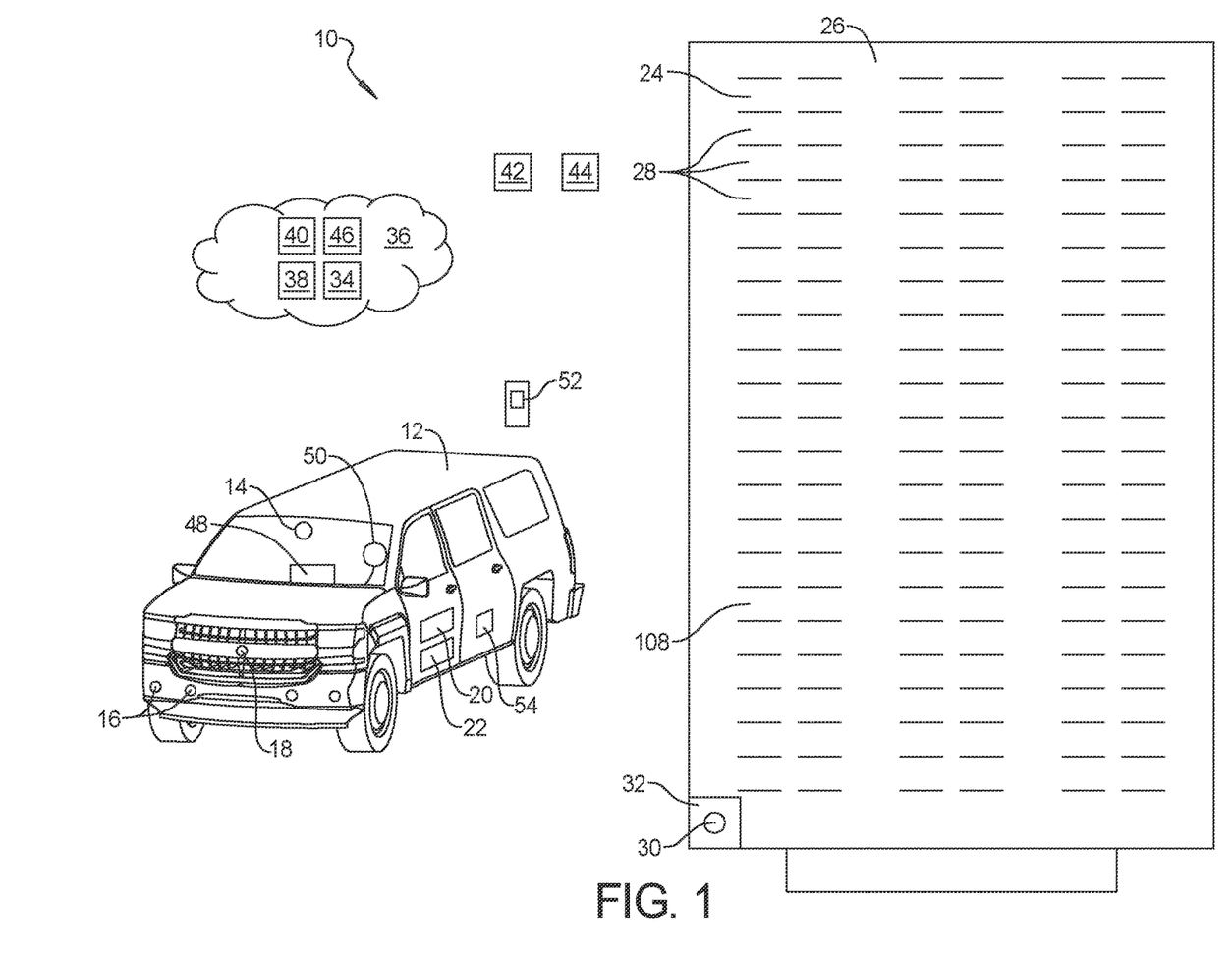
FIG. 1 is a system selecting a parking spot using reinforcement learning according to an exemplary aspect.

Referring to FIG. 1, a system selecting a parking spot using reinforcement learning 10 is provided for a host vehicle 12, which may define an autonomous vehicle (AV) or a non-AV. According to several aspects the host vehicle 12 includes a camera 14 and multiple sensors including at least one RADAR (radio detection and ranging) sensor 16 and at least one LIDAR (light detection and ranging) sensor 18. Outputs from the camera 14, the RADAR sensors 16 and the LIDAR sensors 18 are forwarded to a perception system 20. The perception system 20 communicates with a computer 22. The system selecting a parking spot using reinforcement learning 10 identifies at least one parking spot availability 24 in a parking lot 26 having multiple parking spots 28 and obtains visual data from the camera 14 of the host vehicle 12, the RADAR sensor 16 and the LIDAR sensor 18 and may obtain further visual data from one or more cameras 30 in a parking infrastructure 32 of the parking lot 26 if available.

Figure 3:
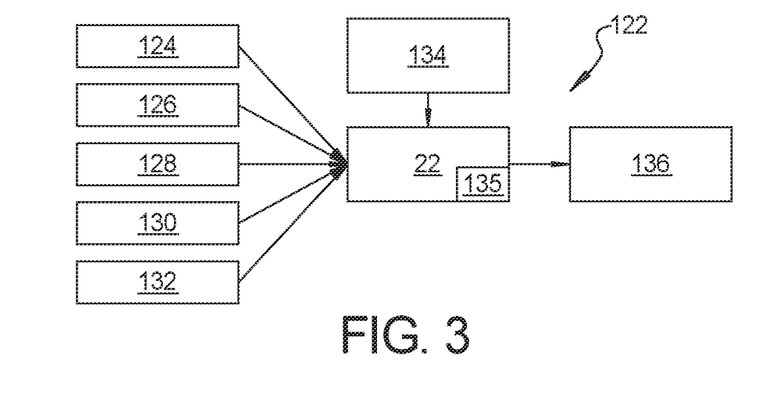
FIG. 3 is an architecture of a belief update mechanism for the system of FIG. 1.

The computer 22 retrieves information including a time of day, weather, location, and the like from an information source 134 described in greater detail in reference to FIG. 3. The computer 22 uses input from the above noted sensors, from multiple monitors described in reference to FIG. 3 and from the information source 134 to compute a probability of the parking spot availability 24 which may be a present or a future availability. The computer 22 forwards the probability of the parking spot availability 24 to an update module 34 of a cloud database 36 to update an initial belief probability 38.

The cloud database 36 also includes a general belief 40 for the parking lot 26 as well as for multiple other parking lots such as a second parking lot 42 and a third parking lot 44. Multiple other parking lots (not shown for clarity) may also be included. The cloud database 36 further includes a (reinforcement learning) RL model 46 having an RL program described in greater detail below.

The host vehicle 12 may further include a vehicle screen 48 which is used to enter user preferences by a user 50 such as a driver or a passenger of the host vehicle 12 on the vehicle screen 48. User preferences may also be entered via a device 52 such as a cellphone of the user 50. A communication module 54 provides communication between the host vehicle 12 and other vehicles (not shown) which may be provided with communication systems capable of communicating with the host vehicle 12, including a (vehicle-to-infrastructure) V2I, a (vehicle-to-vehicle) V2V or a (vehicle-to-anything) V2X communication system.

The computer 22 described in reference to FIG. 1 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Referring to FIG. 2 and again to FIG. 1, a flow diagram of the system selecting a parking spot using reinforcement learning 10 provides process flow steps for using the system. In a first loading step 56, a map of a selected parking lot such as the parking lot 26 is loaded. In an initial belief loading step 58, an initial belief 60 of a parking spot occupancy is loaded. The initial belief 60 is a copy of the initial belief probability 38 described in reference to FIG. 1. If a parking lot is visited for a first time by any user the initial belief probability 38 is created. A belief including the initial belief probability 38 and the initial belief 60 and updated beliefs are defined herein is a data structure in which a probability of individual parking spots within the selected parking lot being occupied is stored. The belief is time-varying and depends on features of the selected parking lot including a quantity of parking spots and parking lot geometry, parking spot locations, weather and the like. The initial belief 60 may be updated such as by use of a neural network, or another predictor to keep the belief updated, and to predict a parking spot availability for a period of time such as a next n-seconds. In a first decision step 62, a first request 64 is identified to determine does a reinforcement learning agent exist for this parking lot? An RL will not exist for this parking spot unless a user has previously visited this parking spot. If a response to the first request 64 is NO 66, in a first follow-up loading step 68 of a loading operation 70, a default reinforcement learning agent is loaded and the RL model 46 is created on the cloud database 36 for this parking lot. If a response to the first request 64 is YES 72, in a second follow-up loading step 74 of the loading operation 70, a corresponding reinforcement learning agent for the identified parking lot such as the parking lot 26 is loaded from the RL model 46.

Figure 2:
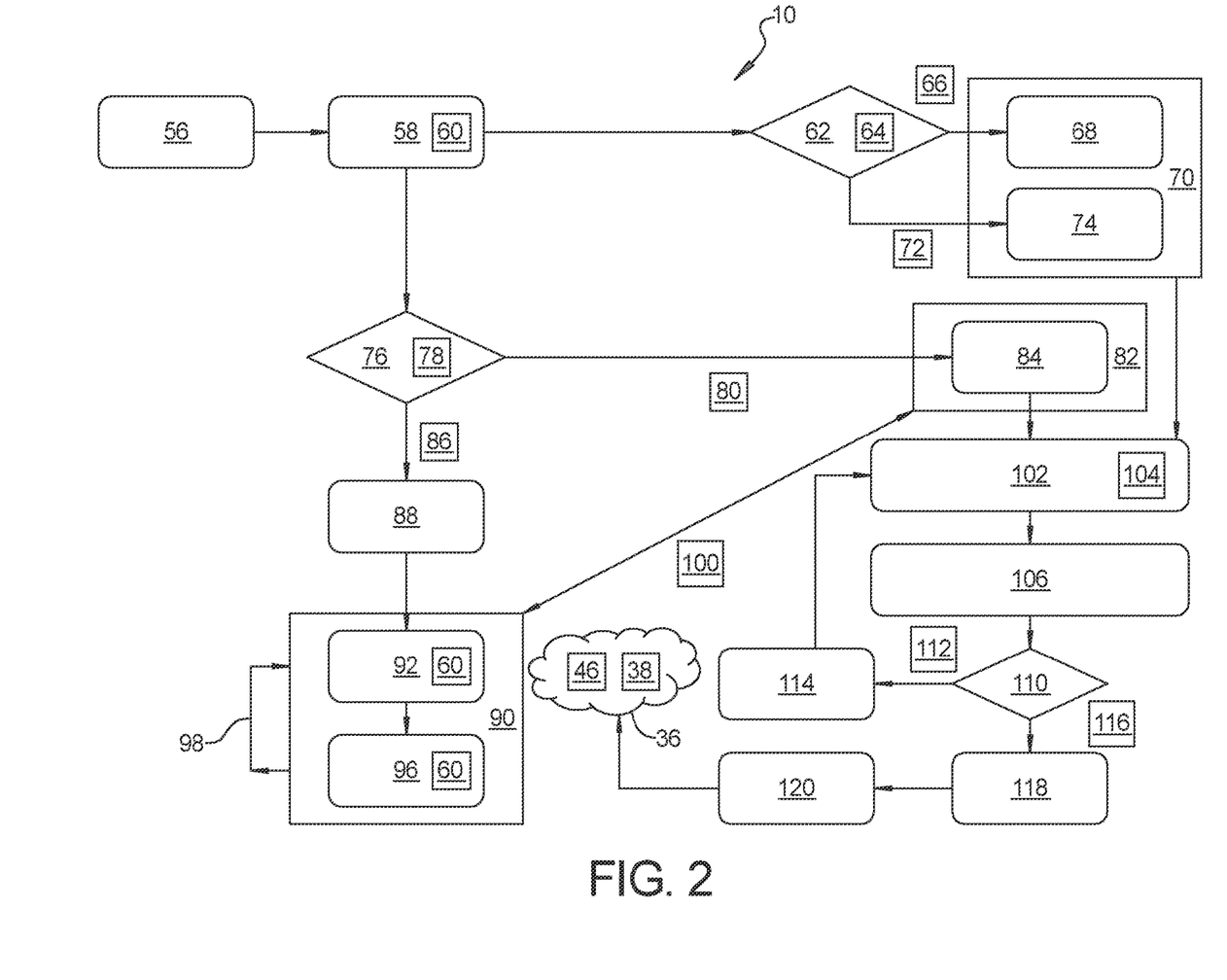
FIG. 2 is a flow diagram of the system of FIG. 1.

After the first decision step 62 is performed, in a second decision step 76 a second request 78 is identified to determine if a V2I operator command is available, if a V2V operator command is available or if a V2X operating command is available for this parking lot and if a parking lot operator command exists from a parking lot operator? If a response to the second request 78 is a NO 80, a continuous observation operation 82 is queried to retrieve information 84 from the perception system 20 described in reference to FIG. 1 and the initial belief 60 is updated.

If a response to the second request 78 is YES 86, the operator command exists and a command may be separately generated to park in the identified parking lot, and in an update operation 88 the initial belief 60 is updated. The user may specify a row or column to park in defining a set of parking spots. When this specification is made the probability of other columns and rows is set to zero in the belief and the RL 46 is limited to a selection in the specified row or column. Following the second decision step 76, an observation operation 90 is begun wherein a first observation 92 is performed to identify if: the parking lot is equipped with V2I available; available parking spots may be identified; and the initial belief 60 is updated. After the first observation 92, a second observation 96 is performed to identify if the parking lot is equipped with V2V, and if so, then occupied parking spots are communicated and identified, and the initial belief 60 is updated in an updating and continuous monitoring operation 98 repeats. The observation operation 90 communicates with the continuous observation operation 82 via a data exchange 100.

An output of the loading operation 70 and of the continuous observation operation 82 are forwarded to a run operation 102 wherein an RL program 104 is run. Following the run operation 102, in a directing operation 106 the host vehicle 12 is directed to go to a designated parking spot 108 identified in reference to FIG. 1. A designated parking spot as defined herein is a potentially available parking spot which may be selected by the RL program 104 as being potentially available based on data received by the host vehicle 12 from a parking lot, or multiple potential parking spots may be identified by the RL program 104 for selection by the user 50, or the designated parking spot may be selected by the RL program 104 based on parking spots that may be potentially available and based on limitations such as previously identified parking preferences made by the user 50 or other users of the host vehicle 12. During travel to the designated parking spot 108 the host vehicle 12 obtains visual data from the camera 14 of the host vehicle 12 as well as from the RADAR sensors 16 and the LIDAR sensors 18 and the cameras 30 in the parking infrastructure 32 identified in reference to FIG. 1. When the host vehicle 12 reaches the designated parking spot 108 a third decision step 110 is performed. If a parking spot NOT AVAILABLE determination 112 is identified when the host vehicle 12 arrives at the designated parking spot 108 shown in FIG. 1, in an update step 114 the initial belief 60 is updated and the run operation 102 is repeated. If a parking spot AVAILABLE determination 116 is identified when the host vehicle 12 arrives at the designated parking spot 108, the host vehicle 12 is independently instructed to perform a park maneuver 118. After the park maneuver 118 is completed, an update step 120 is then performed wherein with continuing reference to FIG. 1 the (reinforcement learning) RL model 46 is updated for the parking lot such as the parking lot 26 on the cloud database 36, and the belief 60 is used to update the initial belief 38 in the cloud database 36.

Referring to FIG. 3 and again to FIGS. 1 and 2, an architecture of a belief update mechanism 122 supplies information to the system selecting a parking spot using reinforcement learning 10 incudes features as follows. In a first monitor 124 monitors available parking spots. A second monitor 126 monitors users returning to their vehicles. A third monitor 128 monitors an appearance of vehicle open trunks or hatches. A fourth monitor 130 monitors illuminated backup and turn signals for a vehicle in a parking spot. A fifth monitor 132 monitors illuminated backup and turn signals for other un-parked vehicles that are not in the designated parking spot 108 and which may also be waiting to park.

As previously noted with reference to FIG. 1, an output of the first monitor 124, the second monitor 126, the third monitor 128, the fourth monitor 130 and the fifth monitor 132 is forwarded to a belief update algorithm 135 located on the computer 22. According to several aspects the belief update algorithm 135 may use machine learning and deep learning. The belief update algorithm 135 also retrieves information including a time of day, weather, location, and the like from an information source 134. The belief update algorithm 135 performs an update operation to generate and update a belief probability 136 defining a probability of an availability of a parking spot.

Figure 4:
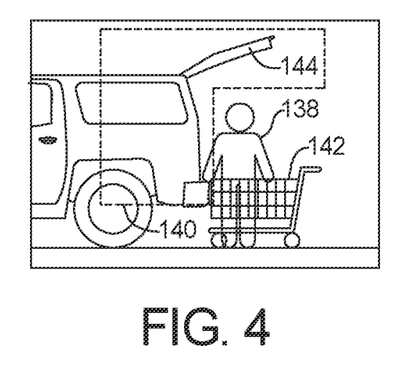
FIG. 4 is an elevational view of a vehicle parked in a potentially available parking space having an open trunk.

Referring to FIG. 4 and again to FIGS. 1 through 3, the system selecting a parking spot using reinforcement learning 10 obtains visual data from the camera 14 of the host vehicle 12 and cameras 30 in the parking infrastructure 32 if available to track a returning user 138 to a parked vehicle 140. The returning user 138 may have a cart 142 which is locally processed and may further increase a probability the returning user 138 has completed their parking use and that a parking spot occupied by the vehicle 140 may therefore be soon available. A detected open lid 144 is a further visual indication that increases the probability that the parking spot occupied by the vehicle 140 may be soon available.

Figure 5:
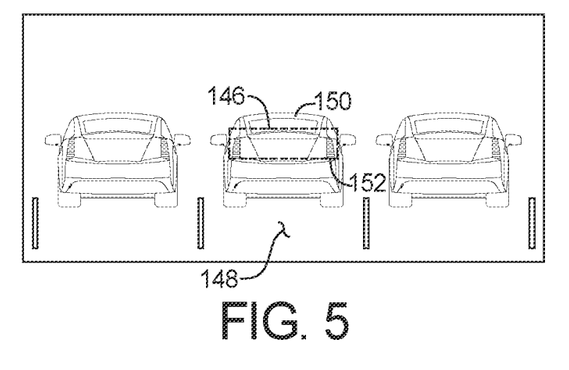
FIG. 5 is an elevational view of a vehicle parked in a potentially available parking space with illuminated backup lights.
Figure 6:
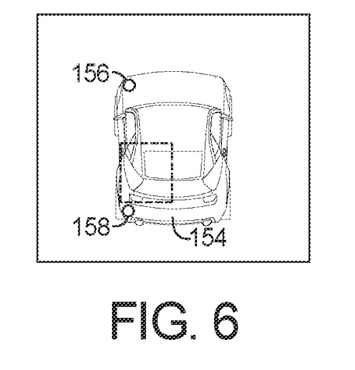
FIG. 6 is an elevational view of a vehicle signaling to occupy an available parking space.

Referring to FIG. 5 and again to FIGS. 1 through 4, the system selecting a parking spot using reinforcement learning 10 also obtains visual data from the camera 14 of the host vehicle 12 to identify visual clues by locating illuminated backup lights or turn signals in an image shown by a bounding box 146. The clue located by the bounding box 146 may indicate a potential parking spot 148 presently occupied by a parked vehicle 150. Evidence of the parked vehicle 150 leaving the parking spot 148 and therefore increasing a probability of an available parking spot may be illuminated backup lights 152 indicating the vehicle 150 is operating may be leaving the potential parking spot 148. The illuminated backup lights 152 for the parked vehicle 150 within the parking spot 148 may modify the belief for the availability of the single parking spot defined by the parking spot 148. Illuminated turn signals or backup lights such as those described in reference to FIG. 6 may also modify the belief for an availability of the single parking spot 148 if illuminated for the parked vehicle 150 prior to moving the parked vehicle 150.

Referring to FIG. 6, and again to FIGS. 1 through 5, the system selecting a parking spot using reinforcement learning 10 further obtains visual data from the camera 14 of the host vehicle 12 to identify visual clues that a non-user vehicle 154 may be waiting for a potential parking spot identified by the host vehicle 12. The visual data includes an operating front turn signal 156 or an operating rear turn signal 158. The non-user vehicle 154 stopped close to the designated parking spot 108 with turn signals illuminated will decrease the belief in the availability of the designated parking spot 108.

Referring to FIG. 7 and again to FIG. 1, a user interface screen 160 presented by the vehicle screen 48 presents a first step for operation of the system selecting a parking spot using reinforcement learning 10. As noted herein, reinforcement learning (RL) is used to optimize a parking spot selection. Parking spot selection is optimized based on predetermined user preferences which may be entered using a ranking scale 162 by the user 50 on the vehicle screen 48 or the device 52, including: a total walking distance 164, which may include returning a shopping cart; a driving time to reach the parking spot 166 such as the driving time to find the designated parking spot 108; a walking time required to walk from the parking spot to a business' door 168; a user preference to park in a shaded or shadow area 170; an availability of (electric vehicle) EV charging 172; an availability of heavy item pickup 174, and the like.

Figure 7:
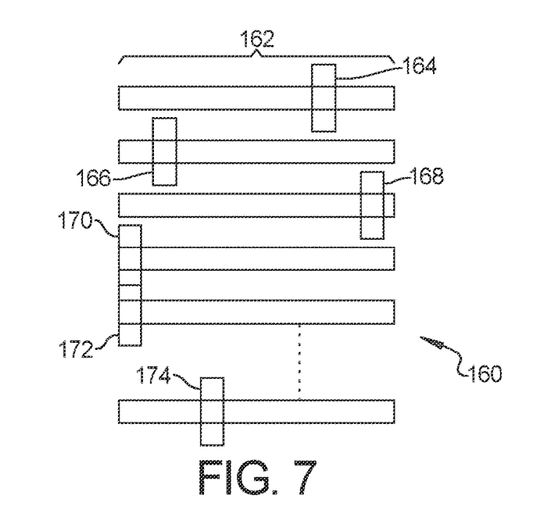
FIG. 7 is a bar diagram presenting a human interface on the screen of FIG. 1 for users to specify a parking preference.

Referring to FIG. 8 and again to FIG. 7, a parking lot 176 similar to the parking lot 26 may include multiple entrances including a first entrance 178 and a second entrance 180. A destination 182 such as a store, a business, an office building, and the like is located at a predetermined position proximate to the parking lot 176. Shade items 184 such as trees and tall structures proximate to the parking lot 176 may provide shaded or shadow areas as a preferred location for some users. Handicapped parking spaces 186 may also be available as a preferred parking spot for some users. EV charging stations 188 may also be available at multiple predetermined parking spots. As previously noted in reference to FIG. 1, during travel to the designated parking spot 108 the host vehicle 12 obtains visual data from the camera 14 of the host vehicle 12, from the RADAR sensors 16 and the LIDAR sensors 18 and from one or more cameras 190 in parking infrastructure including the destination 182. The host vehicle 12 may also communicate with cameras and a perception system of other vehicles in the parking lot.

Figure 8:
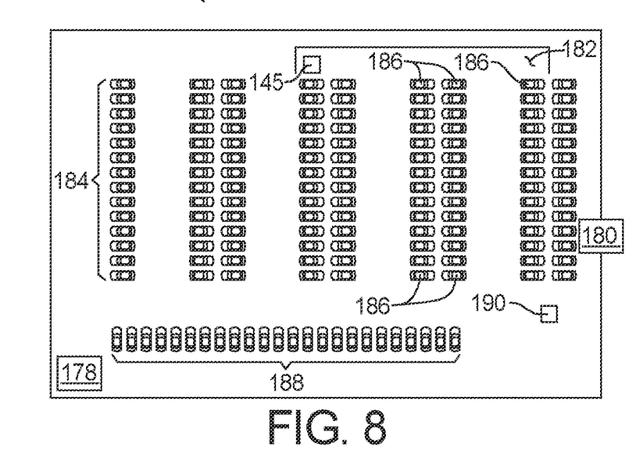
FIG. 8 is a plan view of a parking lot presenting features incorporated in the bar diagram of FIG. 7.
Figure 9:
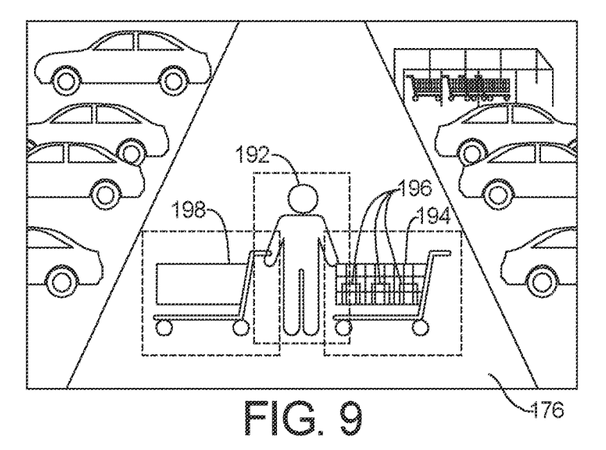
FIG. 9 is an elevational view of the parking lot of FIG. 8 also presenting features incorporated in the user interface of FIG. 7.

Referring to FIG. 9 and again to FIGS. 7 and 8, the system selecting a parking spot using reinforcement learning 10 identifies objects which signify a returning user 192 within the parking lot 176 in order to identify or track the returning user 192. The system selecting a parking spot using reinforcement learning 10 therefore uses the camera 14 of the host vehicle 12 to identify a cart 194 having one or more packages 196 which increases the probability of an available parking space. The user 192 may also select a parking space if the user 192 anticipates one or more heavy items 198 may be required to be brought to the parked user's vehicle. Any combination of the cart 194, the packages 196 and the heavy items 198 also associated with the user 192 provides an indication the user 192 is returning to a parked vehicle. The system selecting a parking spot using reinforcement learning 10 therefore uses the camera 14 of the host vehicle 12 to identify the cart 194, the packages 196, the heavy items 198 and the user 192 to increase the probability of an available parking space. Nearby spot probabilities are increased, and further away spot probabilities are decreased using the information from the camera 14.

Figure 10:
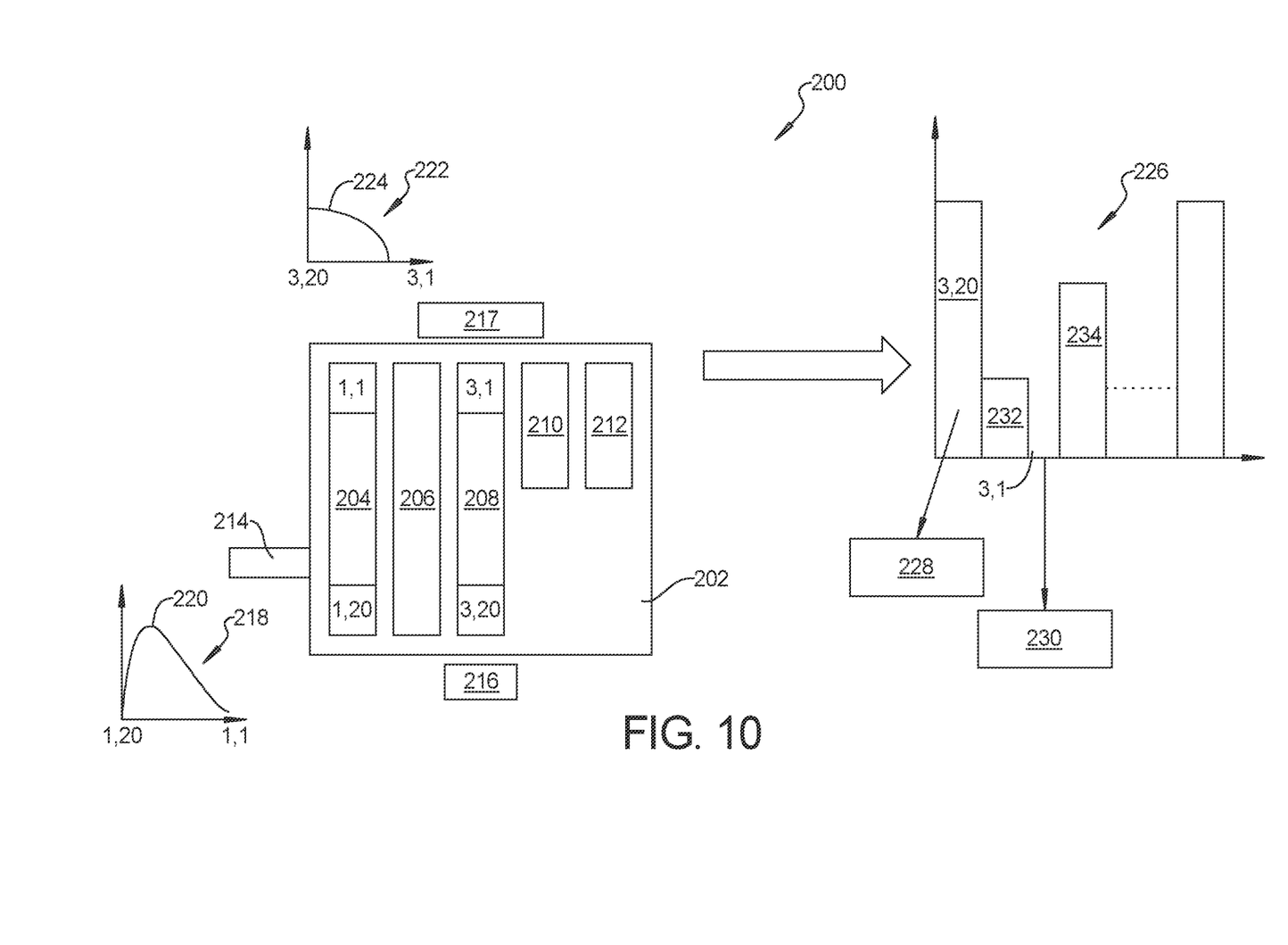
FIG. 10 is a chart of a structure of the belief of FIG. 1.

Referring to FIG. 10, a belief update 200 for individual parking spots is presented using a parking lot structure 202. The parking lot structure 202 includes five parking rows including a first row 204, a second row 206, a third row 208, a fourth row 210 and a fifth row 212. The first row 204 has twenty columns of parking spots indicated as parking spot 1,1 for row 1, column 1 through 1,20. The third row 208 has twenty columns of parking spots similarly indicated as 3,1 through 3,20. A first entrance 214 and a second entrance 216 are provided to the parking lot structure 202, and a destination 217 is indicated. For the first row 204 an initial belief graph 218 presents an initial belief curve 220 of availability of an open parking spot in the twenty parking spots of the first row 204. In this example, a highest probability is presented on the initial belief curve 220 at approximately a parking spot 1,16, while a lowest probability is presented at parking spot 1,1 and parking spot 1,20. The parking spot 1,20, as well as parking spots 1,19, 1,18 1,17 and the like may provide an advantage such as being equipped with EV charging stations that make these parking spots more appealing to some users. For the third row 208 an initial belief graph 222 presents an initial belief curve 224 of availability of an open parking spot in the twenty columns of the third row 208. In this example, a highest probability is presented on the initial belief curve 224 at approximately parking spot 3,20, which steadily declines to a lowest probability at parking spot 3,1.

Initial belief curves 218 and 222 may be estimated statistically based on basic information about the parking lot including a map of the parking lot, locations of entrances to the parking lot, entrances to business buildings, locations of EV charging stations and the like. For example, it may be statistically shown that the parking spots closest to the entrance of a business are less likely to be available. The belief matrix may be generated by an algorithm and be used for unvisited parking lots.

After applying the perception system 20 and using communication from the host vehicle data sources including the vehicle camera 14 and available cameras in parking infrastructure, a graph 226 presents an updated belief for specific ones of the parking spots of the parking lot structure 202 which may be indicated as empty or free to park in or occupied with no indication (such as from illuminated vehicle lights, open lids and the like) of becoming available soon. In this example, the parking spot 3,20 is identified as confirmed free with an indication 228 that no vehicle is waiting for the parking spot. In contrast, the parking spot 3,1 is confirmed to be occupied, with an indication 230 that the parking spot presents no evidence that it will be available for parking in a future of n-minutes. Other column-spots are indicated as blocks such as a block 232 which indicates a parking spot having a low probability of being available, and a block 234 indicates a parking spot having a higher probability of being available while not being confirmed available.

In a training phase, many different parking lot structures such as the simulated parking lot structure 176 which may be imaginary or a real parking lot are generated for the RL to solve. For the parking lot structure 176, many different preferences as Reward ($R_i$) values described below are randomly generated. Multiple scenarios are then created in which different parking spots are available or occupied and an occupancy changes over time. Individual scenarios are repeated and an RL agent tries to score better in successive scenarios. The multiple scenarios are updated to identify occupied spots as noted above. The RL trained by such simulations will be further fine-tuned on a real vehicle in different real parking lots. The result will be a general RL which will be loaded for a new parking spot that is never visited by any users.

The system selecting a parking spot using reinforcement learning 10 performs a reinforcement learning setup as follows. Initially, a reward is calculated as follows. The reward is calculated using equation 1 below.

$$\text{Reward} = \alpha_i R_i \text{ where } \alpha_i \text{ are entered by the user through the screen } 162 \text{ shown in FIG. 7.} \quad \text{Equation 1}$$

Where, $R_1$=a total walking distance including returning a cart; $R_2$=a driving time to drive to the parking space; $R_3$=a walking time to walk to a business door; $R_4$=a parking shadow preference; $R_5$=a handicap spot preference; $R_6$=availability of EV charging YES or NO; and $R_7$=a desired distance to park away from other vehicles.

An action space of the RL is then determined as follows. A space to park is picked based on the score to park at a spot (r,c), where r is a row, c is a column. For street side parking 1 or 2 rows will be presented.

An observation space of the RL consists of a belief matrix about an availability of a spot which is updated by the perception system 20. Time of day, date, holiday, special events, weather and temperature are factors included in the perception.

An algorithm may be used to run the system selecting a parking spot using reinforcement learning 10 of the present disclosure. Steps taken by the algorithm may include: Step 1) Load a map of a parking lot; Step 2) Load an initial belief of a parking spot occupancy; Step 3) Identify is a V2I or a V2V operator command available, or an operator command from a parking lot operator? If no, go to Step 7; Step 4) If an operator exists and commands the host vehicle 12 to park in a particular region: update the initial belief; Step 5) If the parking lot is equipped with V2I: get available spots, and update a belief matrix; Step 6) If V2V is available, communicate and identify occupied spots and update the initial belief; Step 7) Get information from perception including for example a host vehicle camera or from cameras in a parking infrastructure, and update the initial belief. Communicate with other vehicles' cameras and cameras in the infrastructure; Step 8) Load a default RL agent or load a corresponding RL agent for the parking lot if already visited by any previous user; Step 9) Run reinforcement learning to identify a designated parking spot; Step 10) Move the host vehicle 12 to the designated parking spot; Step 11) When the host vehicle 12 arrives at the designated parking spot, identify if the spot is available? If yes, go to Step 13 else go to Step 12; Step 12) Update the initial belief and go to Step 9; Step 13) End and update initial belief and the RL for the parking lot.

According to several aspects, the method of the present disclosure is based on reinforcement learning (RL) developed to select a parking spot based on predetermined user preferences. The method of the present disclosure tracks possible parking spots that may soon become available.

Reinforcement learning (RL) is used to optimize parking spot hunting based on user identified needs. The RL is fine-tuned to pick spots in individual parking lots that the user may visit frequently. If the parking lot is full, the present system and method are effective as a perception system to monitor clues for soon to be available spots to hunt for a next parking spot availability. The environment is dynamic and differs at individual parking lots, therefore RL fine tuning continues when the user operates the host vehicle 12.

The system selecting a parking spot using reinforcement learning 10 provides two modes of operation: a first mode is available for an autonomous vehicle (AV) as the host vehicle 12 and a second mode is available for non-AVs as the host vehicle 12. For AVs, the user may be dropped at an entrance door and the AV may locate and park the AV in automatic park mode. The user may communicate with the AV via a smart phone to request a pick-up. In this instance, a walking distance to the host vehicle 12 may not be relevant.

The environment is dynamic and differs at individual parking lots, therefore RL fine tuning continues when the user operates the host vehicle 12. The system selecting a parking spot using reinforcement learning 10 creates a new profile or model on the cloud database 36 for the parking lot if one does not already exist, starting by loading a pre-trained model. The system selecting a parking spot using reinforcement learning 10 loads the profile if it is pre-visited. A user helps improve the individual parking lot spot hunting model by different visits to the multiple parking lots thereby improving the initial belief 60 which is a copy of the initial belief 38 and the RL model 46 retained on the cloud database 36. The system selecting a parking spot using reinforcement learning 10 communicates with other vehicles' cameras or cameras positioned in parking infrastructure to update the belief.

When leaving a parking spot, the system selecting a parking spot using reinforcement learning 10 informs other vehicles in communication with the host vehicle 12 and communicates with other vehicle cameras and perception systems to identify a new availability which thereby updates the belief. The perception system 20 monitors other users and other vehicles leaving a parking lot to hunt for a next possible availability. In an almost full parking lot, the system selecting a parking spot using reinforcement learning 10 monitors empty spots, open vehicle trunks and illuminated backup and turn lights to help detect future availabilities.

The system selecting a parking spot using reinforcement learning 10 provides multiple features including the system users to help improve the individual parking lot spot hunting model by individual visits to a parking lot (belief update and RL model improvement). The system communicates with other vehicles' cameras or cameras in parking infrastructure to update a belief. The perception system 20 monitors for evidence of users who are leaving such as carts and open trunks to hunt for the next possible availability. In an almost full parking lot, the system is helpful by monitoring empty spots, open trunks and illuminated backup and turn signal lights to detect future availabilities. When the host vehicle 12 leaves a parking spot, the host vehicle 12 may inform other vehicles about a new availability and update the belief.

The system selecting a parking spot using reinforcement learning 10 of the present disclosure offers several advantages. These include use of reinforcement learning (RL) to optimize a parking spot selection, optimizing the spot selection based on user preferences, tracking of a probability of a parking spot to be free for a next few seconds (belief); provision of two modes of operation: AV and non-AV; continuing RL fine tuning when the user operates the host vehicle 12; creating a new profile (model) on the cloud database for a parking lot starting with a pre-trained model; loading the profile if a parking lot has been pre-visited.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to select a parking spot using reinforcement learning, comprising:
   loading a map of a parking lot into a host vehicle, the parking lot map including designated parking spots;
   loading an initial belief of a parking spot occupancy of each of the designated parking spots, wherein the initial belief is an initial believed probability that each of the designated parking spots is occupied;
   identifying that a parking lot communication is available to the host vehicle when one of a (vehicle-to-infrastructure) V2I communication, a (vehicle-to-vehicle) V2V communication and a V2X (vehicle-to-anything) communication is available and a parking lot operator command is available;
   updating the initial belief to a belief matrix based on available parking spots communicated from the V2I and the V2V;
   retrieving information from a perception program including at least one of a host vehicle camera and a camera in a parking infrastructure, and further updating the belief matrix;
   receiving a user preference input that corresponds to preferences for desired characteristics of the designated parking spots;
   running reinforcement learning (RL) to select one of the designated parking spots based on the user preference input and the belief matrix; and
   commanding the host vehicle to move to the selected one of the designated parking spots.

2. The method of claim 1, further including communicating with cameras and a perception system of other vehicles using the V2V communication.

3. The method of claim 2, further including loading one of a default RL agent for an unvisited parking lot not yet visited by the host vehicle and a corresponding RL agent for the parking lot if the parking lot has already been visited by the host vehicle.

4. The method of claim 2, further including:
   an operator of the parking lot identifying a row having multiple parking spots; and
   identifying if the one of the designated parking spots is available when the host vehicle arrives at the one of the designated parking spots.

5. The method of claim 4, further including updating the belief matrix and updating the RL for the parking lot visited by the host vehicle.

6. The method of claim 1, further including commanding to move the host vehicle into the selected one of the designated parking spots when the host vehicle arrives at the selected one of the designated parking spots and the selected one of the designated parking spots is not occupied.

7. The method of claim 6, further including:
   updating an RL model for the parking lot on a cloud database after the host vehicle completes the move into the selected one of the designated parking spots; and
   updating the initial belief.

8. The method of claim 1, wherein the user preference input includes a walking distance from the host vehicle parked in the designated parking spot to the destination; a moving time to move the host vehicle to the designated parking spot; a walking time for the user to walk from the host vehicle parked in the designated parking spot to the destination; a user preference to park in a shaded spot; an availability of an electrical vehicle charging station; and an availability of a pickup service.

9. The method of claim 1, further including:
   communicating between the host vehicle and a camera of a remote vehicle in the parking lot to update an initial belief of the remote vehicle; and
   informing the remote vehicle when the host vehicle leaves the selected one of the designated parking spots.

10. The method of claim 1, wherein the initial belief is based on time of day, weather, locations of entrances to the parking lot, entrances to business buildings relative to the designated parking spots, and locations of EV charging stations relative to the designated parking spots.

11. The method of claim 1, wherein the perception program includes monitoring users returning to one of multiple vehicles parked in the parking lot to assist in calculating the probability of the future parking spot availability.

12. The method of claim 1, wherein the perception program includes monitoring an appearance of vehicle open trunks or hatches in the parking lot to assist in calculating the probability of the future parking spot availability.

13. The method of claim 1, wherein the perception program includes monitoring illuminated backup and turn signals of parked vehicles to assist in calculating the probability of the future parking spot availability.

14. The method of claim 1, wherein the perception program includes monitoring illuminated backup and turn signals of un-parked vehicles waiting to park to assist in calculating the probability of the future parking spot availability.

15. The method of claim 1, wherein the initial belief and the belief matrix is time-varying and depends on features of the parking lot including a quantity of parking spots, a parking lot geometry, parking spot locations, weather and perceptual information clues including slots being occupied, returning users, back-up lights on and turn signals on.

16. The method of claim 15, wherein a copy of the initial belief is located on the cloud and updated based on data collected from multiple other vehicles, and wherein the initial belief is loaded, modified based on a perception system and exchanged information with the multiple other vehicles and updated on the cloud after parking the host vehicle.

17. The method of claim 16, wherein the initial belief is updated using at least one of a neural network and a predictor to keep the belief updated, and to predict the available parking spots for a period of time.

18. The method of claim 1, wherein the user reference input is calculated using an equation, wherein the user reference input=$\alpha_i R_i$ where $\alpha_i$ are entered by a user via a vehicle screen in the host vehicle, and where $R_i$ is at least one of: $R_1$=a total walking distance including returning a cart; $R_2$=a walking time to a destination such as a business door; $R_3$=a drive time to find a driving space; $R_4$=a parking shadow preference; $R_5$=identification if a handicap permit is required yes or no; $R_6$=identification if a heavy item pickup is required yes or no; $R_7$=identification if electrical vehicle charging is required; and $R_8$=identification if parking away from other vehicles is required.

* * * * *